US009587417B2

(12) United States Patent
Van Gastel

(10) Patent No.: US 9,587,417 B2

(45) Date of Patent: Mar. 7, 2017

(54) DEVICE FOR ACTUATING A MOVING PART OF A VEHICLE WITHOUT CONTACT

(75) Inventor: Peter Van Gastel, Solingen (DE)

(73) Assignee: HUF HULSBECK & FURST GMBH & CO. KG, Velbert (DE)

( * ) Notice: Subject to any disclaimer, the term of this patent is extended or adjusted under 35 U.S.C. 154(b) by 0 days.

(21) Appl. No.: 13/142,886

(22) PCT Filed: Dec. 30, 2009

(86) PCT No.: PCT/EP2009/068042

§ 371 (c)(1), (2), (4) Date: Jun. 30, 2011

(87) PCT Pub. No.: WO2010/076332

PCT Pub. Date: Jul. 8, 2010

(65) Prior Publication Data

US 2011/0276234 A1 Nov. 10, 2011

(30) Foreign Application Priority Data

Dec. 30, 2008 (DE) ........................ 10 2008 063 366

(51) Int. Cl.

*G06F 7/00* (2006.01)
*E05B 81/78* (2014.01)

(Continued)

(52) U.S. Cl.

CPC .............. *E05B 81/78* (2013.01); *E05F 15/73* (2015.01); *E05B 81/77* (2013.01); *E05F 15/00* (2013.01);

(Continued)

(58) Field of Classification Search

CPC . B60R 25/01; B60R 25/2054; G07C 9/00944; E05F 15/2023; E05Y 2900/546; E05Y 2400/858; E05Y 2400/852

(Continued)

(56) References Cited

U.S. PATENT DOCUMENTS 6,906,627 B1 * 6/2005 Principe ............. A63B 69/0002 340/556
6,956,465 B2 * 10/2005 Meyer .................... G01G 17/06 180/272

(Continued)

FOREIGN PATENT DOCUMENTS

DE 102004041709 B3 10/2005
DE 102005032402 B3 * 9/2006

(Continued)

OTHER PUBLICATIONS

International Search Report PCT/EP2009/068042; Dated Apr. 1, 2010.

*Primary Examiner* — Jean-Paul Cass

(74) *Attorney, Agent, or Firm* — Cantor Colburn LLP

(57) ABSTRACT

The present invention relates to a device for actuating a moving part (10) of a vehicle (1), particularly a trunk lid (10.1), a side door (10.2), or the like, without contact, comprising a first detection means (11) for detecting an object in a first detection area (11*a*) and a second detection means (12) for detecting an object in a second detection area (12*a*) so that the actuation of the moving part (10) can be activated through the detection means (11, 12). According to the invention, the first detection means (11) is designed as a first capacitance sensor (11), and the second detection means (12) is designed as a second capacitance sensor (12), wherein means (13, 14) are provided, with which the detection areas (11*a*, 12*a*) can be specified in areas separated from each other.

17 Claims, 3 Drawing Sheets

(51) Int. Cl.
*E05F 15/73* (2015.01)
*G07C 9/00* (2006.01)
*E05F 15/00* (2015.01)

(52) U.S. Cl.
CPC ... *E05Y 2400/852* (2013.01); *E05Y 2400/858* (2013.01); *E05Y 2400/86* (2013.01); *E05Y 2900/531* (2013.01); *E05Y 2900/548* (2013.01); *G07C 9/00126* (2013.01); *G07C 2009/00746* (2013.01); *G07C 2209/64* (2013.01)

(58) Field of Classification Search
USPC ............................................................... 49/25
See application file for complete search history.

(56) References Cited

U.S. PATENT DOCUMENTS

| | | | | | |
|---|---|---|---|---|---|
| 7,187,282 | B2 * | 3/2007 | Fergusson | G01D 5/2405 | 340/13.2 |
| 7,843,325 | B2 * | 11/2010 | Otto | A61B 5/0002 | 340/506 |
| 8,091,280 | B2 * | 1/2012 | Hanzel | B60R 25/2054 | 296/146.4 |
| 2001/0052839 | A1 * | 12/2001 | Nahata | E05B 81/78 | 340/5.72 |
| 2002/0125994 | A1 | 9/2002 | Sandau et al. | | |
| 2003/0216817 | A1 * | 11/2003 | Pudney | E05B 81/78 | 700/17 |
| 2005/0179415 | A1 * | 8/2005 | Nakano | H03K 17/955 | 318/478 |
| 2006/0001545 | A1 * | 1/2006 | Wolf | A47K 3/001 | 340/573.1 |
| 2008/0211519 | A1 * | 9/2008 | Kurumado | G01D 5/24 | 324/688 |
| 2008/0246723 | A1 * | 10/2008 | Baumbach | G06F 3/03547 | 345/156 |
| 2008/0277171 | A1 * | 11/2008 | Wright | G06F 1/3203 | 178/18.06 |
| 2009/0109018 | A1 * | 4/2009 | Richter | G01V 3/088 | 340/533 |
| 2009/0171180 | A1 * | 7/2009 | Pering | A61B 5/0002 | 600/372 |
| 2011/0118946 | A1 * | 5/2011 | Reimann | B60R 25/2036 | 701/49 |
| 2011/0313619 | A1 * | 12/2011 | Washeleski | E05F 15/40 | 701/36 |
| 2013/0234828 | A1 * | 9/2013 | Holzberg | B60R 25/2054 | 340/5.72 |
| 2013/0291439 | A1 * | 11/2013 | Wuerstlein | B60R 25/2054 | 49/357 |

FOREIGN PATENT DOCUMENTS

| | | | | | |
|---|---|---|---|---|---|
| DE | 102005021145 | A1 | * | 11/2006 | |
| DE | 102006007958 | A1 | | 8/2007 | |
| DE | 102005032402 | B3 | * | 9/2008 | |
| EP | 0770749 | A2 | | 5/1997 | |
| EP | 1099812 | A2 | | 5/2001 | |
| EP | 1235190 | A1 | | 8/2002 | |
| EP | 1902912 | A1 | * | 3/2008 | B60R 25/00 |
| EP | 1902912 | B1 | * | 10/2012 | |
| WO | WO 2006056425 | A1 | * | 6/2006 | |
| WO | 2009132766 | A1 | | 11/2009 | |

* cited by examiner

DEVICE FOR ACTUATING A MOVING PART OF A VEHICLE WITHOUT CONTACT

TECHNICAL FIELD

The present invention relates to a device for the non-contact actuating of a moving part of a vehicle, in particular a trunk lid, a side door or the like, comprising a first detection means for detecting an object in a first detection area and a second detection means for detecting an object in a second detection area such that the actuation of the moving part can be activated by means of the detection means.

BACKGROUND

Actuating a trunk lid without contact can be useful for example when a person has their hands full with objects and manually operating the trunk lid is not possible or only possible with difficulty. The object detected by the detection means can be a person who approaches the vehicle with the intention of actuating the trunk lid or a side door or the like. The actuating of the trunk lid, the side door or the like thereby designates both an opening action, for example when a person wants to place an object held in both hands in the trunk or passenger compartment, or the actuation relates to a closing action when the person takes an object out of the trunk or passenger compartment using both hands.

EP 1 902 912 A1 discloses a generic device for actuating a vehicle trunk lid without contact. A detection means in the form of a sensor arrangement is proposed therein which monitors some of the area outside the vehicle for the presence of an object or part of a user's body. The sensor device is installed and aligned such that it can detect part of a leg or a foot of the person standing next to the vehicle.

Detection thereby further comprises a body movement, for example related to the lifting or turning of the leg or the foot of the person within the area outside of the vehicle monitored by the sensor arrangement. A signal to actuate the trunk lid can thereby also be disadvantageously triggered in cases not necessarily involving the person's leg or foot. For example, animals can pass through the area outside of the vehicle monitored by the sensor arrangement or an object, for example a ball, can move or roll through the monitored outside area. It is thus advantageous to prevent a malfunctioning of the vehicle trunk lid actuation.

A further device for actuating a trunk lid of a vehicle without contact using detection means is known from DE 10 2004 041 709 B3. This document proposes arranging a first detection means for detecting an object in a first detection area and a second detection means for detecting an object in a second detection area such that said detection means can activate the trunk lid actuation. Reference is made to vehicle devices known as distance detection systems or PDC systems (park distance control systems) as the detection means. These systems operate via ultrasound or radar sensors and serve to monitor an area outside of the vehicle.

Ultrasound sensors or radar sensors used as detection means for detecting objects in the area outside of the vehicle exhibit high power consumption. Therefore, continuous monitoring of the area outside of the vehicle by such sensors cannot be satisfactorily realized. The vehicle's battery is used as the energy source to supply said sensors such that the device for the non-contact actuating of a trunk lid cannot remain switched on permanently.

BRIEF SUMMARY

The invention provides a device for actuating a moving part of a vehicle without contact which overcomes the disadvantages of the aforementioned prior art and enables continuous monitoring of the area outside of a vehicle. To be particularly enabled is a reliable and low-energy monitoring of the area outside of a vehicle.

The invention comprises the technical teaching that the first detection means is configured as a first capacitance sensor and the second detection means is configured as a second capacitance sensor and wherein means are provided with which the detection areas can be specified in individually separate areas. Further detection means, likewise with their own detection areas, can additionally be provided.

Within the context of the present invention, the term "moving part" refers to any vehicle door, side door, sliding door, hatch or the like having at least one closed position and one open position, whereby the closed position is realized by means of an electrical and/or mechanical lock in order to prevent inadvertent or unauthorized opening. In particular, the lock of said moving part can interact with the vehicle's central locking system, preferably an "active or passive Keyless Go system." The vehicle itself can be a motor vehicle.

Realizing the detection means as capacitance sensors yields a device for the non-contact actuating of a moving part of a vehicle of very low energy consumption. This in turn yields the advantage that the capacitance sensors can be kept in continuous operation to monitor an area outside of the vehicle, preferably in the area of the trunk lid or the side doors. The capacitance sensors can be configured and dimensioned such that their energy consumption is less than 100 μA, at least in static state. Such low power consumption enables continuous monitoring of the area outside of the vehicle such that the device for the non-contact actuating of a moving part of a vehicle can always remain in a state of operational readiness.

A further improvement of the function of the device for the non-contact actuating of a moving part is achieved by providing means with which the detection areas can be predefined into individually separate areas. This thus achieves the advantage that the first detection area will not overlap the second detection area. Individually separate detection areas enables different parts of a person's body to be detected independently. Using the inventive means to spatially separate the detection areas can reduce the power consumption of the capacitance sensors even further. The capacitance sensors can respectively comprise one or more sensor electrodes in capacitive coupling to the immediate vicinity, whereby the greater the charge density, the higher the capacitive coupling.

Yet providing the inventive means to specify the respective detection areas can result in a lower electrical charge stored on the sensor electrodes so as to still achieve high sensitivity for the capacity sensors. The consequence is that the power consumption is further reduced, achieving a further improvement of the device for actuating the moving part without contact.

One advantageous embodiment of the device comprises both means for the first as well as means for the second detection area. More than two detection means can also be provided so that there can also be a third or further detection area(s). These detection means can be of identical or similar configuration to the first and/or second detection means and can thus also comprise the respective capacitance sensors having clearly-defined detection areas. The means for the detection areas are realized such that the first detection area exhibits a substantially horizontal extension whereas the second detection area exhibits a substantially vertical extension. A third detection area of a third detection means can be arranged for example adjacent the first or second detection area. It is also conceivable for a third detection area to be arranged between the first and second detection area. This thus enables the reliable, precise metrological detecting of an object and/or a respective motion pattern of the object, whereby improper actuation of the moving part can be reliably prevented. To actuate a trunk lid, the capacitance sensors can preferably be arranged at the rear end of the vehicle and in particular in and/or on the rear bumper of the vehicle. The capacitance sensors are arranged such that the first capacitance sensor having the horizontal detection area can detect for example a leg of an upright moving person as the object to be detected. Hence, if a person approaches the rear end of the vehicle, this motion is detected by the first capacitance sensor having the horizontal detection area. When the person then stands behind the vehicle and moves a foot in the area underneath the rear bumper, this motion can be detected by the second capacitance sensor having the vertical detection area. To actuate a side door in the door sill area of the vehicle, the capacitance sensors can in particular be arranged in and/or on the bottom of the vehicle side door. It is also conceivable for the capacitance sensors to be directly arranged on or in the door sill and not the side door itself. As with the trunk lid, it is preferable here to provide for at least one horizontal and one vertical detection area.

Making use of at least two detection areas allows the device to recognize the intent to actuate the moving part of the vehicle from a motion pattern produced by the object. For example, if the person lifts his foot, a further change in the charge on the sensor electrode of the second capacitance sensor can occur. Hence, the actuating of the trunk lid can be linked to a predefined motion pattern of the person and in particular a motion pattern of the person's foot. This motion pattern can for example ensue after the person approaches the vehicle and encompasses a single or preferably double or repeated movement of the foot.

It is also conceivable for the capacitance sensor to initially detect the movement of a leg, wherein e.g. the second capacitance sensor first switches on. When the second capacitance sensor switches on, it attempts to metrologically detect the respective foot of the leg, for example detecting the foot entering into the second detection area. This motion pattern can be used to trigger the actuating of the moving part. It is also conceivable that the foot needs to be promptly pulled back out of the second detection area as applicable in order to trigger the actuating of the moving part. Likewise, the leg may possibly also need to be withdrawn from the first detection area before the actuating of the moving part can be triggered. It is moreover conceivable for a third detection means, which can likewise be configured as a capacitance sensor, to first detect a person approaching the vehicle, whereupon the monitoring of the motion pattern starts or is switched on. The detected approach can also serve to initially switch on the first and second detection means.

The first and/or the second capacitance sensor can be configured in the form of a wire or a foil, wherein the wire or foil forms the sensor electrode of the capacitance sensor. Preferably, the wire or foil sensor electrode can extend over one part or preferably over the entire width of the vehicle bumper, respectively the width of the vehicle side door. In consequence thereof, the device for actuating a vehicle trunk lid or side [door] can be used from different areas in close proximity to the rear or the respective side door of the vehicle. The sensor electrodes can be a component of the rear bumper, the side door or the door sill, or can be adhesively affixed or secured with fastening means in the interior of same. The sensor electrodes can further be incorporated by injection molding during the manufacturing of the bumper. In so doing, the capacitance sensors exhibit a spatial separation within the bumper, the side door or the door sill such that the first capacitance sensor is positioned more in the vertically-extending area whereas the second capacitance sensor is preferably positioned in the lower area of the rear bumper, side door or door sill which gives way to the horizontal.

To improve the defining of the geometrically individually separated detection areas, the means provided thereto are designed in the form of metallic shields. Said metallic shields extend to the side of the capacitance sensors facing away from the first and the second detection area so that the shields surround the capacitance sensors as a half shell, whereby at least one insulating layer is provided between the capacitance sensors and the shields. The metallic shields further exhibit the same electrical potential as the respective sensor electrodes, whereby the metallic shields can be electrically connected to the respective sensor electrodes hereto. This thereby forms an "active shield" which influences or defines the detection area of the sensor electrodes. The detection area is thereby substantially obstructed in the direction toward the interior of the bumper, the side door or the door sill. In order to be able to have a very specific orientation to the arrangement of the capacitance sensor detection area, it is proposed for the shields to at least partly surround the capacitance sensors in a U shape, whereby the capacitance sensors are arranged in the U-shaped opening and the respective detection area of the capacitance sensors is situated in front of the U-shaped opening of the shield. Hence, the capacitance sensors in this case (U-shaped shield) are not only shielded at the remote rear side of the detection area by the shield, but also to the greatest possible extent at the respective lateral edges. A metallic ground shield can additionally be employed, which can be arranged behind the respective capacitance sensors with their active shields. Same are thus arranged at the rear of the detection area of the respective sensor toward the vehicle. The additional ground shield enables the detection area to be reliably directed away from the vehicle toward the desired area to be monitored.

It is also conceivable to employ so-called compensation or balancing electrodes, each of which are electrically insulated, in addition to the capacitance sensors, e.g. arranged to the left and right of the actual capacitance electrode. Said balancing electrodes can optionally also be shielded by the shield. To the extent that a U-shaped shield is provided, the balancing electrodes are arranged along with the capacitance electrode in the U-shaped opening. The balancing electrodes thereby serve to detect and compensate for metrological malfunctions, e.g. due to contaminating impurities, rain or the like in the detection area of the capacitance electrodes in order to prevent measuring errors on the part of the capacitance sensors.

The metallic shields of the respective capacitance sensors, along with the above-cited compensation or balancing electrodes as applicable, can be realized together with the sensor electrodes as one single component of sandwich-like structure. Insulation is thereby provided between the metallic shields and the sensor electrodes, and the compensation or balancing electrodes as applicable, as well as any ground shield such that the metallic shield maintains a geometric distance to the sensor electrode in the form of conducting paths or in the form of a foil. In particular, the metallic screen surrounds the sensor electrodes along the lateral edges (e.g. U-shaped as described above), wherein this enables further improving the geometric separating of the respective detection areas from one another.

In accordance with a further advantageous development of the inventive device, a control unit is provided which is connected to the capacitance sensors and operatively connected to an actuating unit for the moving part of the vehicle. The control unit can comprise means serving to feed and operate the capacitance sensors. The control unit can furthermore comprise a logical element between the capacitance sensors and an actuating unit to operate the moving part of the vehicle. Thus, the capacitance sensors can supply the information to the control unit as to whether an object is situated in the respective detection area of the capacitance sensors. The identifying of a given motion pattern can thereby occur in the control unit so that the actuating unit to open or close the moving part is not triggered until the required motion pattern occurs.

It is likewise conceivable for an illuminating and/or display means to be activated after a first signal or once a defined motion pattern has occurred, same illuminating in particular the detection areas. The illumination shows the person which detection area is then waiting for a measurement signal, respectively an object in the detection area. The illuminating and/or display means can also display the actual state of a conditional access system or sensor system. It is thus possible to display the lettering "OPEN" or "CLOSED" on the sidewalk or the street next to or behind the vehicle, in particular by means of a laser diode. This display can be coupled with the detecting of an ID transmitter for the vehicle; i.e. the illuminating and/or display means is only activated when the given sensor system detects the correct ID transmitter in the vicinity of the vehicle.

To operate the device according to the invention, it can further be provided that an ID transmitter be operatively connected to the control unit, preferably by means of a wireless communication link. Such ID transmitters are also known as conditional access systems for vehicle users and are frequently called "Keyless Go systems." When the vehicle user has such an ID transmitter, it is recognized by a transceiver within the vehicle thereby authenticating the user of the vehicle so that he can for example open the vehicle or turn it on. Such an ID transmitter can furthermore be configured to communicate with the control unit component of the inventive device.

In accordance with the invention, the control unit can be further improved such that the moving part is not actuated until the control unit detects the presence of an ID transmitter. For example, if the person with the ID transmitter is not in the area of the vehicle, while the capacitance sensors can detect the motion pattern of a person within the vehicle's detection area, the control unit will not trigger the opening or closing of the trunk lid. Not until the ID transmitter is present and thus an authentication conducted is the moving part actuated by the motion pattern concurrently detected by the capacitance sensors.

The trigger to open or close the moving part can be made further dependent on whether the vehicle is moving or stationary, whereby actuation of the moving part is preferably only triggered when the vehicle is stationary and a speed of "zero" is detected.

As needs dictate, the activating of the moving part can simultaneously control an electro-mechanical lock for the moving part by means of which the moving part can be opened or closed. The moving part can additionally be provided with a raising mechanism with which said moving part can be independently conveyed from its closed position into the open position and vice versa. The opening or closing action can thus ensue fully automatically. The noted raising mechanism can be fully or partially integrated into the electromechanical lock.

In accordance with a further development of the control unit, same is configured such that the moving part is not actuated until the first capacitance sensor detects the presence of a leg within the first detection area and the second capacitance sensor detects the presence of a foot within the second detection area. Of course the actuation of the moving part is then only triggered pursuant this detection pattern when the control unit of the device has previously, concurrently or afterwards recognized the ID transmitter.

According to yet another embodiment, the control unit is configured such that the moving part is only actuated when the first capacitance sensor detects the leg prior to the second capacitance sensor detecting the foot. This thereby prevents that alone the approach of a person will be enough to trigger the closing or opening motion of the trunk lid or side door when there is an object in the area beneath the rear bumper or a side door. The control unit monitors the speed of the vehicle here as well, which preferably needs to be "zero" in order to trigger the opening or closing motion of the trunk lid, such that the vehicle is stationary.

The invention also relates to a method for actuating a moving part of a vehicle, in particular a motor vehicle, with the above-described inventive device. Features and details described in conjunction with the inventive method thereby of course also apply in relation to the inventive device and vice versa.

BRIEF DESCRIPTION OF THE DRAWINGS

Reference will be made in the following to the figures in describing further measures improving the invention together with the description of preferred embodiments of the invention in greater detail. Shown are.

DETAILED DESCRIPTION

Figure 1A:
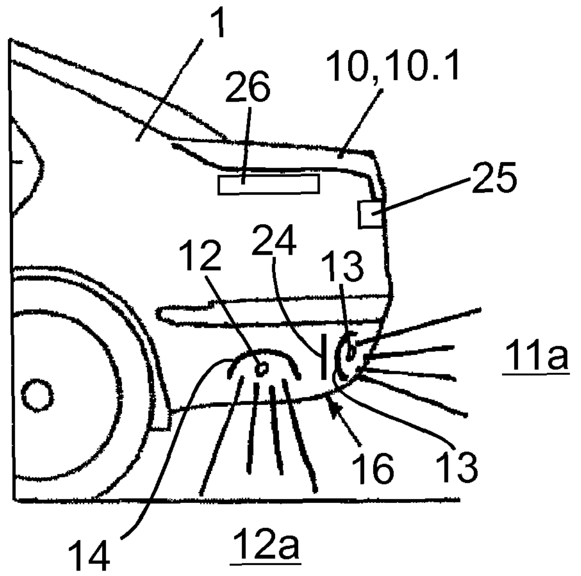
FIG. 1*a* an embodiment of the device for actuating a trunk lid without contact comprising a first capacitance sensor and a second capacitance sensor as well as respective means to specify the detection areas, FIG. 1*b* an embodiment of the device for actuating a side door without contact comprising a first capacitance sensor and a second capacitance sensor, FIG. 2 an embodiment of the device according to the invention for triggering the actuation of a trunk lid by means of a person's leg and foot, FIG. 3 a schematic top plan view of the arrangement of the capacitance sensors inside the rear bumper of a vehicle, FIG. 4 a schematic side view of the arrangement of the second capacitance sensor inside the rear bumper of a vehicle comprising a metallic shield, and FIG. 5 a schematic of the control unit operatively connected to the capacitance sensors, the ID transmitter and the trunk lid.

FIG. 1*a* shows an embodiment of an inventive device for the non-contact actuating of a trunk lid 10.1 as a moving part 10 of a vehicle 1 constituting a motor vehicle. The moving part 10 is held in the closed position and secured by an electromechanical lock 25. The device comprises a first detection means 11 for detecting an object 17, 18 in a first detection area 11*a* and a second detection means 12 for detecting an object in a second detection area 12*a*. The detection means 11 and 12 are configured as capacitance sensors 11 and 12 and only indicated schematically in the figure. Detection area 11*a* covers the horizontal area behind the rear bumper 16 of the vehicle 1. On the other hand, detection area 12*a* covers the lower area beneath the rear bumper 16. Thus, a first detection area 11*a* and a second detection area 12*a* are created which are geometrically separated from one another and have no common area external of the rear bumper 16. The detection areas 11*a* and 12*a* are indicated by beams which however only indicate areas depicting a change in dielectric constant between the capacitance sensors 11 and 12 and the vicinity of the rear bumper 16. This change in dielectric constant causes a change to the charge storable on the electrodes of the capacitance sensors 11 and 12 which the device can detect. Thus, the capacitance sensors 11 and 12 can furnish the presence of an object, in particular the presence of part of a person's body, with minimum power consumption.

Means 13 and 14, configured in the form of metallic shields 13 and 14 and which surround the capacitance sensors 11 and 12 in arc-like or half-shell-like manner, extend behind said capacitance sensors 11 and 12. The shields 13 and 14 predefine both the respective detection areas 11*a* and 12*a*, thereby enabling improved separation of the detection areas 11*a* and 12*a* from one another. The metallic shields 13 and 14 exhibit the same electrical potential as the respective capacitance sensors 11 and 12. Thus, they are so-called "active shields" 13, 14. Additional ground electrodes 24, respectively ground shields 24, can be provided behind said "active shields" 13, 14, with which the detection areas 11*a*, 12*a* of the capacitance sensors 11 and 12 can be orientated in the reverse direction to the ground shields 24; i.e. away from said ground shields 24.

Figure 1B:
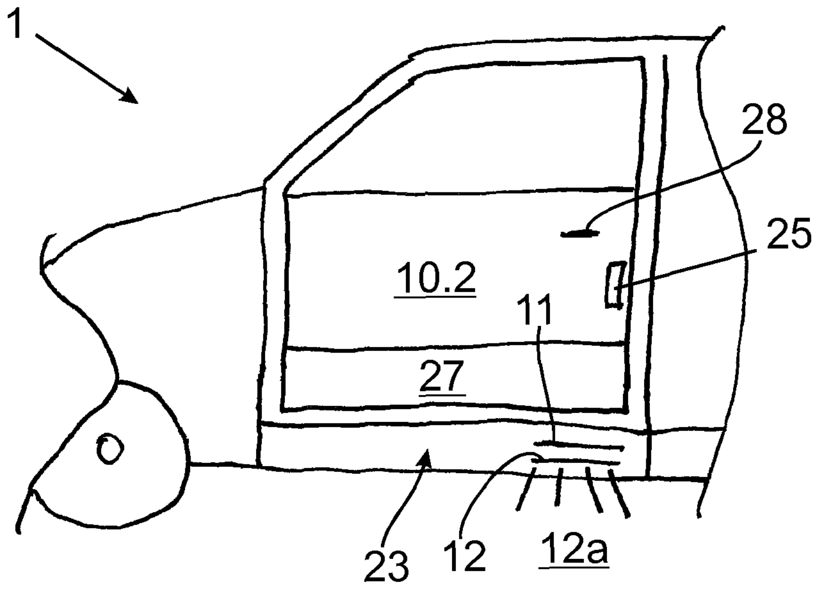

FIG. 1*b* shows a similar embodiment of the inventive device for the non-contact actuating of a side door or a sliding door 10.1 as the moving part 10 of a vehicle 1. The two capacitance sensors 11 and 12 are arranged here in the door sill area 23 and orientated comparably to the aforementioned bumper 16 at the vehicle rear end 15. The two capacitance sensors 11 and 12 can optionally also be arranged in the lower area 27 of the side door 10.2, preferably under a stone guard. An object approaching the side door 10.2 can be detected by the first capacitance sensor 11 or the proximity sensor of the conditional access system, usually arranged in the door handle 28. The embodiments in FIGS. 1 to 5 do not differ with respect to the detection means 11, 12 further detecting a motion pattern for actuating the moving part 10. Said detection means 11, 12 with associated means 13, 14 can also be optionally provided with a ground shield 24.

Figure 2:
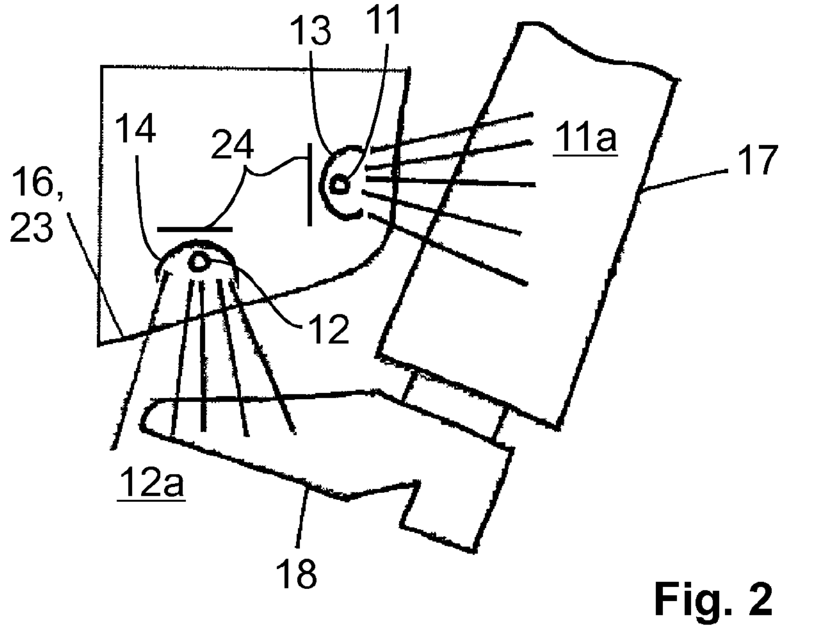

FIG. 2 shows a side view of a detail of the rear bumper 16, respectively the lower area of the side door 10.2, in which the capacitance sensors 11 and 12 with the respective shields 13 and 14 are positioned. According to the representation, part of a person's leg 17 is depicted as protruding into the horizontally-extending first detection area 11*a*. The foot 18 at the end of the leg 17, on the other hand, protrudes into the vertically-extending detection area 12*a* underneath the rear bumper 16 or door sill area 23. The person has for example approached the vehicle 1 near the rear bumper 16 or the side door 10.2. Hence, the first capacitance sensor 11 can detect the person's approach by the leg 17 entering into the first detection area 11*a*. If the person signals the intent to actuate the moving part 10 by moving his foot 18 inward into the second detection area 12*a*, this produces a predefined motion pattern of the person. The coupled detection of both the leg 17 as well as the foot 18 can trigger the actuation of the trunk lid 10.1, respectively the side door 10.2. The respective detection areas 11*a*, 12*a* can likewise be illuminated by a not shown illuminating and/or display means. Lettering can also show the state of the moving part 10 on the sidewalk or the street next to the vehicle. The electro-mechanical lock 25 can be displaced upon the actuation such that the moving part 10 is released, whereby it can be conveyed from a closed position into an open position. The opening and/or closing action can even occur mechanically by the raising mechanism 26 indicated in FIG. 1 which is likewise activated by the actuation.

Ground electrodes 24, respectively ground shields 24, can also be optionally provided in FIG. 2 in addition to the "active shields" 13, 14.

Figure 3:
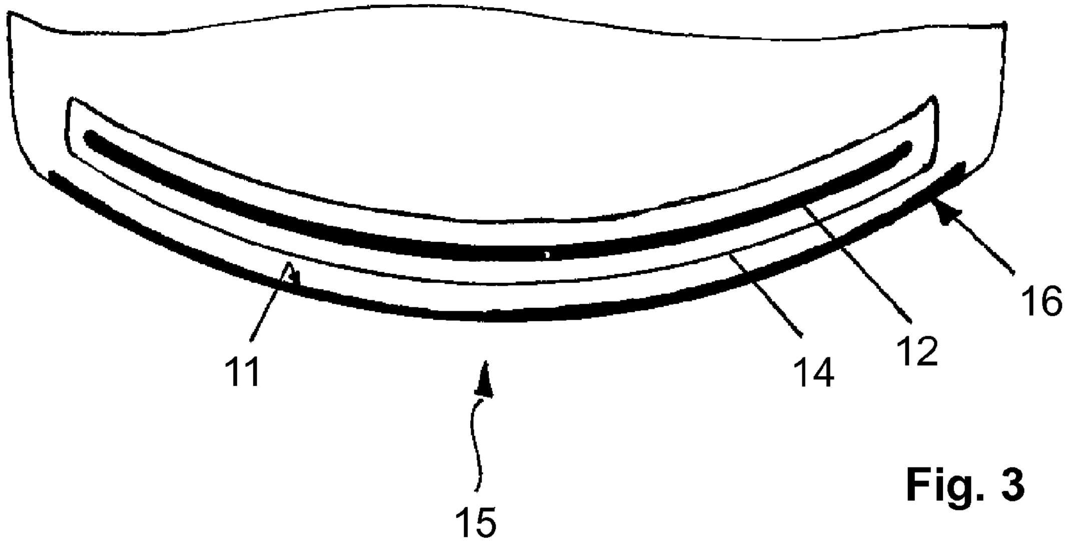

FIG. 3 shows the arrangement of the capacitance sensors 11 and 12 within the rear bumper 16 of the vehicle 1 in a top plan view. The rear bumper 16 extends the entire rear end 15 of the vehicle, whereby the bumper 16 is shown in its entire width. Pursuant the depiction, it can be recognized that the capacitance sensors 11 and 12 can extend over virtually the entire width of the bumper 16. Therefore, a person can approach any point across the entire rear end 15 of the vehicle 1 and make the leg 17 as well as the foot 18 movement as described in FIG. 2.

The depiction shows the arrangement of the first capacitance sensor 11 in the vertical area of the bumper 16 while the second capacitance sensor 12 with its surrounding shield 14 is indicated in the lower area of the bumper 16. The capacitance sensors 12 can be positioned in or run through the width of the bumper 16 as a foil or a conductive path. The capacitance sensors 11 and 12 with the respective shields 13 and 14 are preferably arranged inside the bumper 16.

Figure 4:
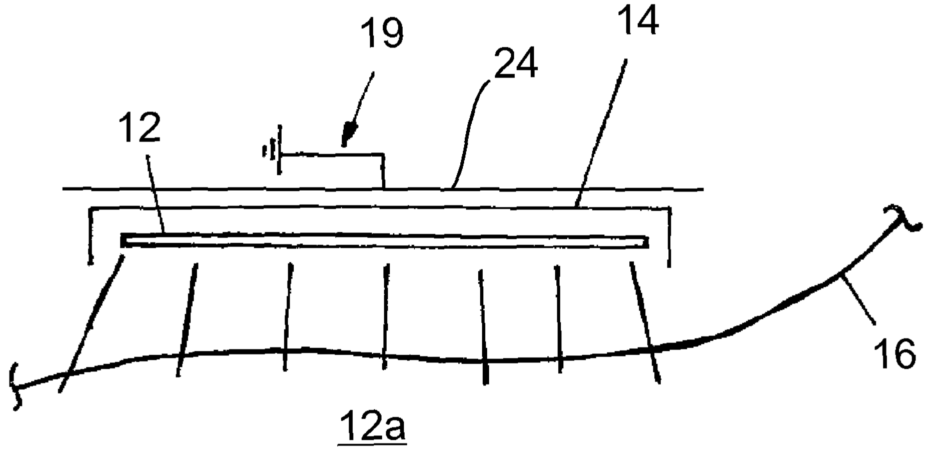

FIG. 4 shows a schematic side view of the arrangement of the second capacitance sensor 12 within the bumper 16 which can also just as readily be arranged in or on the side door 10.2 or the associated door sill. The capacitance sensor 12 is depicted in cross-section and exhibits a planar extension. The capacitance sensor 12 is enclosed on the rear side by a metallic shield 14 which exhibits the same potential as sensor 12 such that the detection area 12*a* is only directed toward the underside of the rear bumper 16. To improve the shielding effect, the ground shield 24 connected to a ground contact 19 illustrated as a grounding and connecting the shield 24 to the vehicle ground is additionally provided. Doing so thus further improves the directional defining of the detection area 12*a*.

Figure 5:
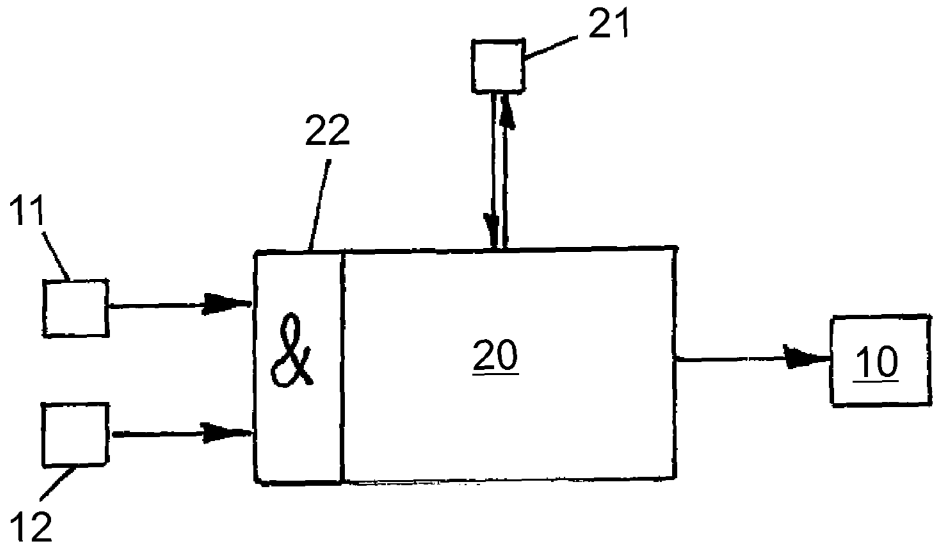

FIG. 5 shows the operative connection of the control unit 20 to the first capacitance sensor 11 and the second capacitance sensor 12 in a schematic view. The control unit 20 comprises a logical element 22 configured as a logical AND element.

The logical AND element 22 effects an activation of the trunk lid 10 when at least the first capacitance sensor 11 and the second capacitance sensor 12 detect the presence of an object. If only one of the capacitance sensors 11 or 12 detect the presence of an object, for example a leg 17 or a foot 18, the control unit 20 will not actuate the trunk lid 10. The actuation of the trunk lid 10 will not be triggered until both capacitance sensors 11 and 12 detect the presence of an object.

An ID transmitter 21 is further indicated which communicates with the control unit 20 by wireless connection. The ID transmitter 21 provides conditional access authorization to authenticate a person and is read by the control unit 20. Actuation of the trunk lid 10 will not be triggered until the presence of such an ID transmitter 21 and the positive signal from both capacitance sensors 11 and 12.

The realization of the invention is not limited to the above-indicated preferred embodiment. In fact, a number of variants which also make use of the represented solution in fundamentally different implementations are conceivable. All the features and/or advantages yielded by the claims, the description or the drawings, including structural details, spatial arrangements and method steps, can be essential to the invention both alone as well as in any combination. Thus, e.g. more than two capacitance sensors with additional detection areas can also be used.

The invention claimed is:

1. A device for actuating a moving part of a vehicle without contact comprising:

- a first detection means for detecting a first object in a first detection area, and
- a second detection means for detecting a second object separate from the first object in a second detection area separate from the first detection area, such that actuation of the moving part is activated by means of the detection means, wherein
- the first detection means is configured as a first capacitance sensor and the second detection means is configured as a second capacitance sensor and wherein specifying means are provided with which the detection areas are specified in individually separate areas wherein the capacitance sensors for a trunk lid are arranged at the rear end of the vehicle, wherein the capacitance sensors for a side door are arranged in a door sill area of the vehicle, wherein the first capacitance sensor in or on the rear bumper, respectively at a bottom of the side door of the vehicle, is arranged such that the horizontally-extending detection area of the first capacitance sensor detects at least a leg of at least one upright moving person
- wherein the control unit is configured such that the moving part is only actuated when the first capacitance sensor detects the leg prior to the second capacitance sensor detecting the foot,
- wherein the first and second detection areas have no common area external of the vehicle and the first detection area is spatially separated from the second detection area such that the separation reduces power consumption of the first and second capacitance sensors,
- wherein the first and second detection areas enable first and second objects to be detected independently,
- wherein the first capacitance sensor initially detects the movement of a leg, wherein the second capacitance sensor first switches on,
- wherein the foot needs to be promptly pulled back out of the second detection area as applicable in order to trigger the actuating of the moving part,
- wherein not until an ID transmitter is present and thus an authentication conducted is the moving part actuated by the motion pattern concurrently detected by the capacitance sensors; and
- wherein the sensor electrodes are a component of the rear bumper, the side door or the door sill, or are adhesively affixed or secured with fastening means in the interior of same,
- wherein the capacitance sensors are arranged in a U-shaped opening and the respective detection area of the capacitance sensors is situated in front of the U-shaped opening of a shield, and the first capacitance sensor is disposed in a vertically extending area and the second capacitance sensor is disposed in a horizontally extending area.

2. The device according to claim 1, wherein said means are configured such that the first detection area exhibits a substantially horizontal extension and said means are configured such that the second detection area exhibits a substantially vertical extension.

3. The device according to claim 1, wherein the second capacitance sensor in or on the rear bumper, respectively at the bottom of the side door of the vehicle is arranged such that the vertically-extending detection area of the second capacitance sensor can detect at least a foot of at least one upright moving person.

4. The device according to claim 1, wherein the capacitance sensors are configured in a form of a wire or a foil and extend substantially over an entire width of the bumper.

5. The device according to claim 1, wherein the specifying means are designed in a form of a metallic shield extending to a side of the capacitance sensors facing away from the first and the second detection area and surround the capacitance sensors as a half shell.

6. The device according to claim 5, wherein the metallic shields respectively exhibit a same potential as the capacitance sensors.

7. The device according to claim 1, wherein at least one capacitance sensor is additionally provided with a ground electrode to align the respective detection area.

8. The device according to claim 1, wherein a control unit is provided which is connected to the capacitance sensors and operatively connected to an actuating unit for the trunk lid of the vehicle.

9. The device according to claim 1, wherein the ID transmitter is operatively connected to the control unit, preferably by means of a wireless communication link.

10. The device according to claim 9, wherein the control unit is designed such that the moving part is not actuated until said control unit detects the presence of the ID transmitter.

11. The device according to claim 1, wherein the control unit is designed such that the moving part is actuated when the first capacitance sensor detects the presence of a leg within the first detection area and the second capacitance sensor detects the presence of a foot within the second detection area.

12. The device according to claim 1, wherein the control unit is designed such that the moving part is only actuated when the first capacitance sensor detects the leg prior to the second capacitance sensor detecting the foot.

13. A method for actuating a moving part of a vehicle including the following steps:

- providing a first detection means;
- detecting a first object in a first detection area with the first detection means;
- providing a second detection means;
- detecting a second object separate from the first object in a second detection area separate from the first detection area such that actuation of the moving part can be activated by the second detection means;
- wherein the first detection means is configured as a first capacitance sensor and the second detection means is configured as a second capacitance sensor and specifying the detection areas in individually separate areas with specifying means,
- wherein the capacitance sensors for a trunk lid are arranged at the rear end of the vehicle, wherein the capacitance sensors for a side door are arranged in a door sill area of the vehicle, wherein the first capacitance sensor in or on the rear bumper, respectively at a bottom of the side door of the vehicle, is arranged such that the horizontally-extending detection area of the first capacitance sensor detects at least a leg of at least one upright moving person wherein the control unit is configured such that the moving part is only actuated when the first capacitance sensor detects the leg prior to the second capacitance sensor detecting the foot, wherein the first and second detection areas have no common area external of the vehicle and the first detection area is spatially separated from the second detection area such that the separation reduces power consumption of the first and second capacitance sensors, wherein the first and second detection areas enable first and second objects to be detected independently, wherein the first capacitance sensor initially detects the movement of a leg, wherein the second capacitance sensor first switches on, wherein the foot needs to be promptly pulled back out of the second detection area as applicable in order to trigger the actuating of the moving part, wherein not until an ID transmitter is present and thus an authentication conducted is the moving part actuated by the motion pattern concurrently detected by the capacitance sensors; and wherein the sensor electrodes are a component of the rear bumper, the side door or the door sill, or are adhesively affixed or secured with fastening means in the interior of same, wherein the capacitance sensors are arranged in a U-shaped opening and the respective detection area of the capacitance sensors is situated in front of the U-shaped opening of a shield, and the first capacitance sensor is disposed in a vertically extending area and the second capacitance sensor is disposed in a horizontally extending area.

14. A vehicle comprising a device in accordance with claim 1.

15. A device for actuating a moving part of a vehicle without contact comprising:

a first detection means for detecting a first object in a first detection area and a second detection means for detecting a second object separate from the first object in a second detection area separate from the first detection area such that actuation of the moving part is activated by means of the detection means, wherein the first detection means is configured as a first capacitance sensor and the second detection means is configured as a second capacitance sensor and wherein specifying means are provided with which the detection areas are specified in individually separate areas, wherein a control unit is provided which is connected to the capacitance sensors and operatively connected to an actuating unit for a trunk lid of the vehicle, wherein an ID transmitter is provided which is operatively connected to the control unit, preferably by means of a wireless communication link, the control unit being configured such that the moving part is only actuated when the first capacitance sensor detects a first body part prior to the second capacitance sensor detects a second body part, wherein the first and second detection areas have no common area external of the vehicle and the first detection area is spatially separated from the second detection area such that the separation reduces power consumption of the first and second capacitance sensors, wherein the first and second detection areas enable first and second objects to be detected independently, wherein the first capacitance sensor initially detects the movement of a leg, wherein the second capacitance sensor first switches on, wherein the foot needs to be promptly pulled back out of the second detection area as applicable in order to trigger the actuating of the moving part, wherein not until the ID transmitter is present and thus an authentication conducted is the moving part actuated by the motion pattern concurrently detected by the capacitance sensors; and wherein the sensor electrodes are a component of the rear bumper, the side door or the door sill, or are adhesively affixed or secured with fastening means in the interior of same, wherein the capacitance sensors are arranged in a U-shaped opening and the respective detection area of the capacitance sensors is situated in front of the U-shaped opening of a shield, and the first capacitance sensor is disposed in a vertically extending area and the second capacitance sensor is disposed in a horizontally extending area.

16. The device according to claim 1, wherein the sensor electrodes are a component of the rear bumper, the side door or the door sill, or are adhesively affixed or secured with fastening means in the interior of same.

17. The device according to claim 1, wherein the sensor electrodes are incorporated by injection molding during the manufacturing of the bumper.

* * * * *